(12) United States Patent
Stebbings et al.

(10) Patent No.: US 7,258,917 B2
(45) Date of Patent: Aug. 21, 2007

(54) ADHESIVE DETACKIFICATION

(75) Inventors: William L. Stebbings, Stillwater, MN (US); Kevin D. Landgrebe, Woodbury, MN (US); Dale C. Perry, Welch, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/655,973

(22) Filed: Sep. 5, 2003

(65) Prior Publication Data

US 2005/0054785 A1 Mar. 10, 2005

Related U.S. Application Data

(62) Division of application No. 09/850,784, filed on May 8, 2001, now Pat. No. 6,627,309.

(51) Int. Cl.
B32B 15/04 (2006.01)
B32B 7/12 (2006.01)

(52) U.S. Cl. ................. 428/352; 428/343; 428/345

(58) Field of Classification Search ............ 428/352, 428/343, 345
See application file for complete search history.

(56) References Cited

U.S. PATENT DOCUMENTS

| | | | |
|---|---|---|---|
| 3,445,234 A | 5/1969 | Cescon et al. | |
| 3,479,185 A | 11/1969 | Chambers, Jr. | |
| 3,549,367 A | 12/1970 | Chang et al. | |
| 3,707,475 A | 12/1972 | Lombardino | |
| 3,772,441 A | 11/1973 | Lombardino | |
| 3,861,950 A | 1/1975 | Danielson et al. | |
| 4,024,312 A | 5/1977 | Korpman | |
| 4,090,877 A | 5/1978 | Streeper | |
| 4,202,696 A | 5/1980 | Takahashi et al. | |
| 4,252,887 A | 2/1981 | Dessauer | |
| 4,286,047 A | 8/1981 | Bennett et al. | |
| 4,311,783 A * | 1/1982 | Dessauer | 430/270.1 |
| 4,459,349 A | 7/1984 | Tanaka et al. | |
| 4,604,340 A | 8/1986 | Grossa | |
| 4,642,126 A | 2/1987 | Zador et al. | |
| 4,652,274 A | 3/1987 | Boettcher et al. | |
| 4,716,095 A | 12/1987 | Grossa | |
| 4,751,108 A | 6/1988 | Larimore et al. | |
| 4,857,372 A | 8/1989 | Ginkel et al. | |
| 5,183,459 A | 2/1993 | Bernard | |
| 5,235,015 A | 8/1993 | Ali et al. | |
| 5,755,905 A | 5/1998 | Sinn et al. | |
| 5,792,588 A | 8/1998 | Wilczak et al. | |
| 5,989,708 A | 11/1999 | Kreckel | |

FOREIGN PATENT DOCUMENTS

| | | |
|---|---|---|
| EP | 0 024 629 | 1/1984 |
| EP | 0 706 091 | 4/1996 |
| GB | 997396 | 7/1965 |
| GB | 1047569 | 11/1966 |

OTHER PUBLICATIONS

Hayashi et al., "A New Phototripic Substance and Its ESR", *J. Chem. Phys.*, vol. 32, pp. 1568 (1960).
Hayashi et al., "Preparation of a New Phototripic Substance", *Bull. Soc. Chem. Japan*, vol., 33, No. 4, pp. 565-566 (1960).
Blinder et al., "Electron Spin Resonance of Tetraphenylpyrryl Radical", *J. Chem. Phys.*, vol. 35, No. 2, pp. 540-544 (1962).
Hayashi et al., "Mechanism of Chemiluminescence of 2,4,5-Triphenylimidazole", *Bul. Soc. Chem. Japan*, vol. 35, No. 12, pp. 2057-2058 (1962).
White et al., "Infrared Spectra of Arylimidazoles and Arylisoimidazoles", *J. Org. Chem.*, vol. 29, pp. 1926-1930 (1963).
Hayashi et al., "The Mechanism of the Photochromism and Thermochromism of 2,2',4,4',5,5'-Hexaphenyl-1, 1'-biimidazolyl", *Bull. Soc. Chem. Japan*, vol. 37, No. 10, pp. 1563-1564 (1964).
Hayashi et al., "A Kinetic Study of the Photochromism of 2,2',4,4',5,5'-Hexaphenyl-1,1'-biimidazolyl with Electron Spin Resonance", *Bull. Soc. Chem. Japan*, vol. 37, No. 11, pp. 1717-1718 (1964).
Hayashi et al., "The Mechanism of the Piezochromism of Hexaphenyl-biimidazolyl", *Bull. Soc. Chem. Japan*, vol. 38, No. 4, pp. 685-686 (1965).
White et al., "Oxidation of Triarylimidazoles. Structures of the Photochromic and Piezochromic Dimers of Triarylimidazyl Radicals", *J. Amer. Chem. Soc.*, vol. 88, 16, pp. 3825-3829 (1966).
Cescon et al., "Some Reactions of Triarylimidazolyl Free Radicals", *J. Org. Chem.*, vol. 36, No. 16, pp. 2267-2272 (1971).
Bradley et al., "Some aspects of the role of amines in the photoinitiated polymerization of acrylates in the presence and absence of oxygen", *Recl. Trav. Chim. Pays-Bas*, vol. 114, pp. 528-533 (1995).
Kuroda et al., "Studies on the use of lophine derivatives as analytical reagents by means of fluorescence and chemiluminescence detection", CCAB 97, (1997).
Zimmermann et al., "1.1'-bis-pyrryle, 1.1'-bis-imidazyle and their dissociation into radicals", *Angew. Chem.*, 73, No. 24, (1961).

* cited by examiner

*Primary Examiner*—Robert D. Harlan
(74) *Attorney, Agent, or Firm*—Philip Y. Dahl

(57) ABSTRACT

The invention describes a method of curing a polymerizable material containing ethylenically unsaturated bonds at a temperature of 60° C. or less, comprising the steps of (a) providing a curative comprising an effective amount of a light-stable isomer of a 2,4,5-triarylimidazolyl dimer, such as bilophine; (b) activating said curative by application of an activator selected from the group consisting of solvent and friction; and (c) combining the activated curative with the polymerizable material.

Articles comprising an adhesive having a detackified surface, such as adhesive bandages, a detackifying solution, a two-part adhesive system, and a fastening system are also provided.

6 Claims, No Drawings

ADHESIVE DETACKIFICATION

CROSS REFERENCE TO RELATED APPLICATIONS

This application is a divisional of U.S application Ser. No. 09/850784, filed May 8, 2001, issued as U.S. Pat. No. 6,627,309, the disclosure of which is incorporated by reference in its entirety herein.

TECHNICAL FIELD

This invention relates to a method of curing a polymerizable material using a light-stable isomer of a 2,4,5-triarylimidazolyl dimer. Applying a solvent or friction activates the dimer.

BACKGROUND

Photosensitive bilophine isomers are known. For example, U.S. Pat. Nos. 3,479,185 and 3,549,367 describe photopolymerizable compositions that include a 2,4,5-triphenylimidazolyl dimer consisting of two lophine radicals bound together by a single covalent bond. Upon irradiation, the dimer is dissociated into free radicals that react with a free radical-producing agent included in the composition. These materials are useful in image-forming systems. U.S. Pat. No. 4,459,349 describes a photopolymerizable resin composition that is highly sensitive to ultraviolet rays yet is thermally stable. The photopolymerization initiation system includes a 2-polycyclic -aryl-4,5-diphenylimidazolyl dimer. British Patent No. 997,396 describes 2,4,5-triphenylimidazole dimers that change color upon exposure to light. British Patent No. 1,047,569 describes light-sensitive compositions including a leuco dye and a 2,4,5-triarylimidazolyl radical. The compositions change from colored to clear upon irradiation with ultraviolet light, and are useful in image-forming systems. Photoimaging compositions containing leuco dyes and triarylimidazoles are also described in U.S. Pat. No. 3,445,234 (2,2',4,4',5,5'-hexaarylbiimidazole) and in EP 0 024 629 B1 (2,4,5-triphenylimidazolyl dimer).

Polyarylimidazoles are described in U.S. Pat. Nos. 3,707,475 and 3,772,441 to inhibit inflammation in mammals. Triphenylimidazolyl compositions are included in Example X of '475 and in Example V of '441.

Various methods of detackification are known. U.S. Pat. No. 3,861,950 describes a process of detackifying rubber using a substituted phenyl group having a sulfenyl chloride substituent. U.S. Pat. No. 4,857,372 describes a graphic composition that includes a thermally detackifiable adhesive premask tape. A diaziridine compound is described to provide initial crosslinking in this premask tape, while a melamine compound extensively crosslinks the tape to detackify it during a later exposure to elevated temperatures, such as encountered during an automotive paint baking cycle. U.S. Pat. No. 4,202,696 describes a method of removing surface tack from a cured resin such as used in photo-relief-type printing plates by treating the resin with specific carbonyl compounds such as benzophenones and anthraquinones. The surface layer of the cured resin is impregnated with the compound, then the impregnated layer is irradiated with specific actinic rays. U.S. Pat. No. 4,286,047 describes an adhesive system containing an oxirane ring-bearing component and a photoinitiator. When this pressure-sensitive adhesive is exposed to ultraviolet light, the adhesion is reduced.

U.S. Pat. No. 4,024,312 discloses a film backed, normally tacky and pressure-sensitive adhesive tape that is highly extensible and highly elastic. The tape can be easily removed from a surface to which it has been applied by stretching it lengthwise in a direction substantially parallel to the plane of the surface. The film backing is formed from elastomeric and thermoplastic block copolymers. A preferred use for this tape is in a bandage. U.S. Pat. No. 5,989,708 describes an adhesive tape that is removable from a substrate by stretching it in a direction substantially parallel to the surface of the substrate. The tape backing is described as highly extensible and substantially inelastic.

DISCLOSURE OF INVENTION

Briefly, the present invention provides a method of curing a polymerizable material containing ethylenically unsaturated bonds at a temperature of 60° C. or less, comprising the steps of (a) providing a curative comprising an effective amount of a light-stable isomer of a 2,4,5-triarylimidazolyl dimer, (b) activating said curative by application of an activator selected from the group consisting of solvent and friction, and (c) combining the activated curative with the polymerizable material.

In another aspect, the present invention provides a method of making an article comprising an adhesive having a detackified surface comprising the step of applying a curative to an adhesive surface of an article comprising an adhesive, said curative comprising a component selected from the group consisting of 2,4,5-triarylimidazole, bilophine and lophine radicals.

In another aspect, the present invention provides a two-part adhesive comprising a first part which comprises a light-stable isomer of a 2,4,5-triarylimidazolyl dimer and a second part which comprises a secondary or tertiary amine and a polymerizable material containing ethylenically unsaturated bonds.

The present invention also provides a detackifying solution comprising a light-stable bilophine, a secondary or tertiary amine, and a suitable solvent.

In still other aspects, the present invention provides articles that include an adhesive having a detackified surface, articles that include an adhesive removable from a substrate, tape articles, and adhesive bandages.

As used herein:

"aryl" means a C6–C20 aromatic group, which may be substituted; and

"substituted" means having substituents that do not interfere with the desired product, e.g., substituents can be alkyl, alkoxy, aryl, phenyl, halo (F, Cl, Br, I), cyano, nitro, etc.

It is an advantage of the present invention to provide adhesive material with various properties. For example, an adhesive having different tackiness on each major side, while the cohesive properties of the bulk or interior of the adhesive remains substantially unmodified. This is useful in matching peel and/or shear adhesion release properties when bonding two different materials.

In addition, one major surface of an adhesive can be crosslinked to a greater extent than the opposing major surface. For example, an adhesive tape can be made wherein one major surface of the adhesive remains a pressure-sensitive adhesive while the opposing major surface of the adhesive is extensively cured with the method of the present invention to provide an essentially non-tacky integral backing for the pressure-sensitive adhesive.

The present invention is useful in a shear-debonding adhesive wherein one major surface of the adhesive has different adhesive properties, such as shear, peel, and tack, than the opposing surface of the adhesive. Such an adhesive is useful for applying graphics to surfaces such as those found on trucks, railway cars, buildings, and billboards.

Additionally, the present invention provides an adhesive packaging method which may be combined with an adhesive delivery method and/or use method. For example, an outer surface of a glue stick or an outer surface of a bulk adhesive mass can be detackified without detrimentally affecting the eventual intended use of the adhesive. The invention provides a thin, thermoplastic shell that is not tacky, and which will mix into the adhesive during application and need not interfere with the complete consumption of the product.

DETAILED DESCRIPTION

The present invention provides a method of curing a polymerizable material containing ethylenically unsaturated bonds at a temperature of 60° C. or less. In this method, a curative comprising an effective amount of a light-stable isomer of a 2,4,5-triarylimidazolyl dimer is provided and activated by applying an activator selected from the group consisting of solvent and friction. Then the polymerizable material is combined with the activated curative.

The curative is a light-stable isomer of a 2,4,5-triarylimidazolyl dimer. A preferred light-stable isomer is 2,2',4,4',5,5'-hexaphenyl-4,4'-biimidazole, also termed bilophine, which has the following structure:

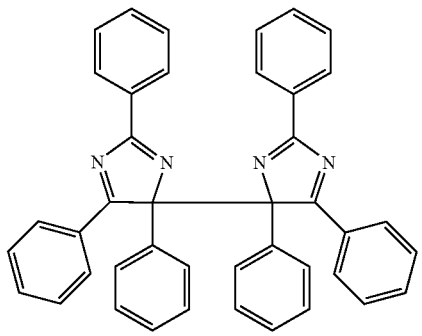

Non-light-stable isomers include 2,2',4,4',5,5'-hexaphenyl-1,1'-biimidazole, 2,2',4,4',5,5'-hexaphenyl-1,2'-biimidazole, 2,2',4,4',5,5'-hexaphenyl-1,4'-biimidazole, 2,2',4,4',5,5'-hexaphenyl-2,2'-biimidazole, 2,2',4,4',5,5'-hexaphenyl-2,4'-biimidazole.

The curative may be mixed with an amine, preferably a secondary or tertiary amine. A preferred amine is N-methyl diethanolamine (NMDEA). When such an amine is included, the steps of providing the 2,4,5-triarylimidazolyl dimer curative, activating the curative, and/or combining the curative with the polymerizable material may be carried out in the presence of air or oxygen.

The activator is selected from the group consisting of solvent and friction. No heat or light is required. The solvent generally can be any organic solvent that dissolves the selected curative and is a liquid at the reaction temperature. The reaction temperature is preferably a temperature between −40° C. and 80° C., more preferably between −20° C. and 60° C., more preferably between 0° C. and 60° C., more preferably between 20° C. and 40° C., and most preferably room temperature. The polarity of the material selected as the solvent should be between that of ethanol and that of hexane, and the dielectric constant of the selected solvent should be less than 24.3 and greater than 1.9. Toluene is a preferred solvent.

A reactive diluent can function as the solvent in the present invention. For example, an ethylenically unsaturated monomer, oligomer, lower molecular weight polymer, or mixtures thereof can activate the curative and then become incorporated into a polymer, either alone or together with another polymerizable material. Thus, the solvent may itself be a polymerizable material or may include a reactive diluent and/or other polymerizable material. A preferred example is ethyl acrylate. The reaction may be slower when the solvent is polymeric than when it is a more traditional solvent, as diffusion mixing of the bilophine and the solvent is required.

The curative may be activated by friction. When bilophine is selected as the curative, it should be ground until a deep violet color develops. This color appears very quickly when firm pressure is applied, for example by using a mortar and pestle. Another useful example of applying friction to activate the curative involves applying the curative to the threads of a bolt, then threading a corresponding nut over these threads to grind the curative. Many other methods of applying friction are known and will be apparent to the skilled artisan armed with this disclosure.

The polymerizable material is a monomer, oligomer, or polymer that contains ethylenically unsaturated bonds. Suitable monomers include acrylates, methacrylates, multifunctional acrylates and methacrylates, and vinyl aryl compounds. Suitable polymers include those having lower molecular weight such that they are readily processed such as in solvents or via melt processing techniques. The polymerizable material may be an adhesive, which may be tackified. Examples include rubber-based adhesives and acrylic adhesives. The polymerizable material is less than completely crosslinked such that ethylenically unsaturated bonds remain in the polymerizable material for use in the curing method of the present invention.

Examples of useful polymerizable materials include mono-, di-, and poly-acrylates and methacrylates (for example, methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethyl methane, bis[1-(3-acryloxy-2-hydroxy)]-p-propoxyphenyl dimethylmethane, trishydroxyethyl-isocyanurate trimethacrylate, the bis-acrylates and bis-methacrylates of polyethylene glycols of molecular weight about 200–500, copolymerizable mixtures of acrylated monomers such as those of U.S. Pat. No. 4,652,274, and acrylated oligomers such as those of U.S. Pat. No. 4,642,126); unsaturated amides (for example, methylene bis-acrylamide, methylene bis-methacrylamide, 1,6-hexamethylene bis-acrylamide, diethylene triamine tris-acrylamide and beta-methacrylaminoethyl methacrylate); vinyl compounds (for example, styrene, diallyl phthalate, divinyl succinate, divinyl adipate, and divinyl phthalate); and the like; and mixtures thereof.

Examples of useful ethylenically unsaturated polymers include polymers with pendant (meth)acrylate groups, for example, having from 1 to about 50 (meth)acrylate groups per polymer chain. Examples of such polymers include aromatic acid (meth)acrylate half ester resins such as Sarbox™ resins available from Sartomer (for example, Sarbox™ 400, 401, 402, 404, and 405). Other useful reactive polymers curable by free radical chemistry include those polymers that have a hydrocarbyl backbone and pendant peptide groups with free-radically polymerizable functionality attached thereto, such as those described in U.S. Pat. No. 5,235,015 (Ali et al.).

Mixtures of two or more ethylenically unsaturated monomers, oligomers, and/or polymers can be used if desired. Preferred ethylenically-unsaturated species include acrylates, aromatic acid (meth)acrylate half ester resins, and polymers that have a hydrocarbyl backbone and pendant peptide groups with free-radically polymerizable functionality attached thereto. Preferred materials include trimethylolpropane triacrylate and trimethacrylate, pentaerythritol triacrylate and trimethacrylate, pentaerythritol tetracrylate, and di-trimethylolpropane tetraacrylate.

The method of curing of the present invention can be used on the surface of an adhesive, such as a pressure-sensitive adhesive, to reduce, minimize, or even eliminate the surface tack. As used herein, "detackify" includes reducing or minimizing tack. A useful test method for quantifying tack level is known in the art as the Polyken probe tack test. Qualitative methods are also useful, such as thumb tack, or applying the adhesive to a substrate and removing the adhesive that, when performed with various materials, can indicate tack differences. The detackified surface has a tack level below about 20 g (more preferably below about 10 g, most preferably below about 5 g) as measured by the Polyken probe tack test.

In one embodiment of the present invention, a surface of an adhesive is detackified with the bilophine-type material and method. Other adhesive surfaces of the same article can remain tacky. For example, a major surface of an adhesive can be detackified while the opposing major surface of the adhesive remains free of the bilophine-type material, and thus remains tacky. Other examples include detackifying: an adhesive bond line, an exposed portion of an adhesive bond line, an edge of an adhesive sheet, an edge of an adhesive tape strip, an edge of an adhesive tape roll, an outer surface of a glue stick, an outer surface of a bulk adhesive mass, a back surface of a unitape, and a back surface of an adhesive strip in an adhesive bandage.

Another embodiment of the present invention allows removal of an adhesive from a substrate by stretching the adhesive, wherein at least one major surface of the adhesive has been detackified or crosslinked with the curative of the present invention. In one such embodiment, the adhesive is removed by stretching the adhesive to at least about 150% (preferably about 300% and more preferably between about 300 and about 1200%) of its initial length at an angle from the plane of the substrate of below about 45°, preferably below about 35°, and more preferably close to about 10°. The adhesive internal (also termed cohesive) strength is preferably greater than about 150% of its adhesive strength.

In another embodiment of the present invention, an article comprising an adhesive having a detackified surface takes the form of an adhesive strip in an adhesive bandage. In this case, the detackified surface comprises an integral backing to the adhesive strip. The integral backing preferably consists essentially of the detackified surface, although other layers and other materials may be used in a particular situation. Such an integral backing allows for a very thin and flexible adhesive bandage that conforms to the skin. In addition, a bandage or gauze pad, such as an absorbent pad, of suitable size can be adhered to the tacky surface of the bandage. The pad is then held in place by the surrounding adhesive and integral backing.

Another embodiment of the present invention includes a solution for detackifying tacky materials. The solution comprises a light-stable bilophine; a secondary or tertiary amine; and a suitable solvent, which solvent can be a non-reactive solvent or a reactive solvent, wherein the reactive solvent is one or more ethylenically unsaturated monomers, oligomers, or low molecular weight polymers, and mixtures thereof. The solvent generally can be any organic solvent or mixture of solvents that dissolves the selected curative and is a liquid at the reaction temperature. The polarity of the solvent or mixture of solvents is preferably between that of ethanol and that of hexane, and the dielectric constant of the solvent or solvent mixture is preferably less than 24.3 and greater than 1.9.

Examples of useful non-reactive solvents include, but are not limited to toluene, xylene, cumene, mesitylene, phenyl acetate, methyl benzoate, benzyl acetate, ethyl benzoate, ethyl acetate, benzyl alcohol, butanol, and propanol. A preferred non-reactive solvent is toluene.

Examples of useful reactive solvents include but are not limited to methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, vinyl compounds (for example, styrene, diallyl phthalate, divinyl succinate, divinyl adipate, and divinyl phthalate); and the like; and mixtures thereof. Preferred reactive solvents include ethyl acrylate, trimethylolpropane triacrylate, and pentaerythritol triacrylate.

The present invention also includes a two-part adhesive system. In this embodiment, a first part which comprises a light-stable isomer of a 2,4,5-triarylimidazolyl dimer is used along with a second part which comprises a secondary or tertiary amine and a polymerizable material containing ethylenically unsaturated bonds. The second part can include a solvent, such as described supra. Such an adhesive system can be activated through the application of friction or a solvent, as described above. The activated adhesive system is crosslinked, or set, by the light-stable isomer of a 2,4,5-triarylimidazolyl dimer, e.g., bilophine. In one aspect of this adhesive system, the crosslinked adhesive can be removed by stretching the adhesive at low angles, such as described above. In another aspect, the adhesive system cures or sets to a more cohesive material or even to a rigid mass having low flexibility.

The two-part adhesive system is suitable for many applications, for example, as a part of a fastening system, which includes at least two parts. Such a fastening system comprises a first element having a first surface bearing thereon the first part of the two-part adhesive composition mentioned above, and a second element having a surface corresponding to and frictionally coupling with the first surface of the first element, which second element surface bears thereon the second part of the adhesive composition mentioned above. In this embodiment, the first element and the second element are more securely fastened together relative to two such elements absent the two-part adhesive system of the present invention. In one aspect, these two elements are permanently joined by the adhesive, meaning that they are intended to become inseparable. As used herein, "permanently joined" encompasses joining where subsequent separation is much more difficult than separating parts not permanently joined, although it is realized that great force and determination may rend asunder even permanently joined parts. When such permanently joined parts are forcibly separated, either or both parts may be defaced or damaged.

In particular examples, the first element is selected from a nut, a threaded region, a first sheet, and a first section of a telescoping pipe; and the second element is correspondingly selected from a bolt, an opposing threaded region such that the two regions threadably connect, a second sheet, and a section of a telescoping pipe corresponding to said first section. In these examples, the two elements correspond, i.e., as a nut to a bolt. Thus, a particular threaded fastener may be more securely, or even permanently, fastened with the adhesive of the present invention. Many other materials may be joined with the adhesive of the present invention, including papers, films, polymers, metals, and ceramics.

Objects and advantages of this invention are further illustrated by the following examples, but the particular materials and amounts thereof recited in these examples, as well as other conditions and details, should not be construed to unduly limit this invention.

EXAMPLES

Detackification of PSA Adhesives

Examples 1–2 and Comparative Examples C1–C2

Kraton™ KX-222C (a low viscosity styrene-butadiene-styrene copolymer with excess pendant carbon-carbon double bonds, from Shell Chemicals, Houston, Tex.) was dissolved in toluene at 10 weight % solids. Ten gram portions of the resulting solution without and with N-methyldiethanolamine (NMDEA) (available from Aldrich Chemicals, Milwaukee, Wis.) and bilophine (prepared by the method of White and Sonnenberg in J. Am. Chem. Soc'y, 88:16, pages 3825–29, 1966) were coated onto polyester film using a handmade knife coater. The resulting coatings were dried at 70° C. for five minutes to result in an adhesive thickness of 10 µm and tested for probe tack, following ASTM Method D 2979–95, using a Polyken probe tack tester (available from ChemInstruments, Mentor, Ohio). A stainless steel probe having a 5-mm diameter flat surface was used with a 1 cm/s peel rate and 1 second dwell time. Results are shown in Table 1.

TABLE 1

Probe Tack of Adhesive Coatings

| Example | Amine | Bilophine | Probe Tack (g) |
| --- | --- | --- | --- |
| 1 | 96 mg NMDEA | 10 mg bilophine | 111 |
| 2 | 96 mg NMDEA | 20 mg bilophine | 84 |
| C1 | None | None | 425 |
| C2 | 96 mg NMDEA | None | 319 |

The results in Table 1 show that the addition of bilophine along with NMDEA to Kraton adhesive prior to coating produced a large reduction in tackiness of the Kraton adhesive.

Example 3 and Comparative Example C3

Kraton™ KX-222C copolymer and Arkon™ M90 (a $C_9$ hydrogenated hydrocarbon resin tackifier available from Arakawa Chemicals, Chicago, Ill.) in a ratio of 50 parts by weight copolymer to 50 parts by weight tackifier were dissolved in toluene at 10 weight % solids. Two portions of the resulting solution (10 g each) were separately coated as in Example 1. After drying for 5 minutes at 60° C., 96 mg of NMDEA was brushed onto the surface on one of the coatings with a cotton swab and 10 mg bilophine dissolved in 96 mg NMDEA was similarly applied to the surface of the other coating. Excess surface reactant was removed by dabbing with a toluene-soaked paper towel. The resulting coatings were dried at 60° C. for five minutes and tested for probe tack as in Example 1. Results are shown in Table 2.

TABLE 2

Probe Tack of Surface-Treated Adhesive Coatings

| Example | Surface Additive | Probe Tack (g) |
| --- | --- | --- |
| 3 | 96 mg NMDEA and 10 mg bilophine | 0 |
| C3 | 96 mg NMDEA | 123 |

The results in Table 2 show that the surface treatment of Kraton adhesive with bilophine along with NMDEA eliminated the tackiness of Kraton adhesive.

Example 4 and Comparative Example C4

A solution of 10 mg bilophine, about 96 mg NMDEA, and 0.5 mL of toluene was applied thickly to the surfaces of a portion of a tackified-rubber glue stick (3M Jet Melt PSA 107489-12, available from 3M, St. Paul, Minn.), using a wooden applicator stick. The probe tack of an untreated surface of the glue stick as well as the probe tack of the resulting treated surface (how long after application?) of the glue stick were determined as in Example 1. Results are shown in Table 3.

TABLE 3

Probe Tack of Tackified-Rubber Glue Stick Surfaces

| Example | Surface Treatment | Probe Tack (g) |
| --- | --- | --- |
| 4 | 96 mg NDMEA, 10 mg bilophine, and 0.5 mL toluene | 133 |
| C4 | None | 810 |

The results in Table 3 show that the surface treatment of a tackified rubber glue stick with bilophine along with N-methyldiethanolamine greatly reduced the tackiness of the glue stick surfaces.

Triggerably Curing Ethylenically Unsaturated Adhesives

Example 5

About 32 mg of NMDEA was added to about 320 mg of pentaerythritol triacrylate (PETA, available from Polysciences, Warrington, Pa.) and mixed by stirring with an applicator stick for about 10 seconds. To 0.5 mL of toluene was added 1 mg bilophine, and the mixture was shaken, causing the initial violet color to intensify. The toluene preparation and the pentaerythritol triacrylate preparation were then mixed and stirred for 10 seconds with an applicator stick. The violet color caused by the radicals from the bilophine disappeared in a short time. Gelled polymer appeared in about 3 minutes, and after 5 minutes the whole mass was hard but covered with a liquid film of toluene. The forgoing was conducted with only ambient heat and light. These results demonstrated the initiation of free radical polymerization of pentaerythritol triarylate with a combination of bilophine, NMDEA, and toluene from two parts without heat or light activation.

Example 6

About 96 mg of NMDEA was mixed into about 1 mL of pentacrythritol triacrylate and allowed to stand open to the air. After 4 days there was no visible change in this composition. A mixture of 15 mg of bilophine in 1 mL of pentaerythritol triacrylate, which had been standing open to the air in room light in the lab for 7 days, was poured into the amine containing composition and stirred for about 10 seconds with an applicator stick. Hard polymer formed in less than a minute. These results demonstrated that no curing occurred without the presence of both bilophine and amine. In addition, rapid curing occurred when the amine and bilophine were present together and when bilophine was dissolved sufficiently in an ethylenically unsaturated resin, even without an added solvent.

Example 7

Bilophine (10 mg) and NMDEA (62 mg) were combined with pentaerythritol triacrylate (1 mL) in a jar and stirred for 10 minutes with an applicator stick. After 26 hours the resulting mixture had set to a gel and after an additional 24 hours the mixture was hard. These results showed that pentaerythritol triacrylate with a small amount of NMDEA was a sufficient solvent to dissociate the bilophine into radicals, and thereby bring about curing of the ethylenically unsaturated resin.

Example 8

About 15 mg bilophine was mixed with about 1 mL of pentaerythritol triacrylate and allowed to stand for about 36 hours. A mixture of about 96 mg of NMDEA in about 1 mL pentaerythritol triacrylate was mixed with the bilophine mixture in the dark. The resulting mixture was held in dark, and after 2 hours gel formed. These results showed that light was not required for this curing reaction.

Example 9

About 10 mg of bilophine and about 18 mg of NMDEA were stirred into about 2 g of pentaerythritol triacrylate and allowed to stand. No change was observed in the resulting formulation after 20 minutes. Toluene (0.5 mL) was then added w mixing, and after about 10 minutes the sample gelled and had turned to a greenish violet color. After an additional 20 minutes the whole mass of sample became quite hard and had turned to a light yellow color. These results showed that addition of toluene accelerated the curing reaction.

Example 10

Example 5 was essentially repeated except that ethyl acrylate was used instead of toluene. Gelled polymer appeared in about 3 minutes. After 5 minutes had elapsed, the whole mass was hard but covered with much less liquid film than that found in Example 5. These results showed that the ethyl acrylate was an effective accelerator, and that the ethyl acrylate, functioning as a reactive diluent, was chemically incorporated into the polymer mass.

Bilophine Activated by Friction (Grinding)

Example 11

Bilophine (15 mg) was ground aggressively in a mortar and pestle until it turned deep violet. The resulting ground bilophine was stirred into about 1 mL trimethylolpropane triacrylate (TMPTA) containing about 96 mg NMDEA. The resulting mixture became hard polymer in 5 minutes. For comparison, the foregoing procedure was repeated except that the bilophine was not ground. The resulting mixture formed a soft gel in a little more than one hour. These results showed that grinding the bilophine greatly accelerated the curing reaction.

Bonding an Article

Example 12

About 1 mg of bilophine was patted onto the threads of a galvanized bolt. A nut was screwed onto the bolt, causing the bilophine to be ground and to turn deep violet. About 6 small drops of a solution, made from 1 mL of trimethylolpropane triacrylate (TMPTA from Aldrich Chemicals) and about 96 mg NMDEA, were placed on the deep violet area of the bolt, and the nut was screwed or to cover this area. After about 5 minutes had elapsed, the nut could no longer be turned by hand.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A two-part adhesive comprising a first part which comprises a light-stable isomer of a 2,4,5-triarylinaidazolyl diner and a second part which comprises a secondary or tertiary amine and a polymerizable material containing ethylenically unsaturated bonds, wherein said secondary or tertiary amine is N-methyl diethanolamine.

2. The adhesive of claim 1 wherein said second part further comprises a solvent.

3. An activated adhesive system comprising a combination of the first part of the two-part adhesive of claim 1 and the second part of the two-part adhesive of claim 1.

4. A set adhesive system comprising the reaction product of the first part of the two-part adhesive of claim 1 and the second part of the two-part adhesive of claim 1.

5. The adhesive system of claim 4 which is removable from a substrate to which the adhesive is adhered by stretching the adhesive to at least about 150% of its initial length at an angle below about 35° from the substrate.

6. The adhesive system of claim 4 wherein the cured combination is rigid.

* * * * *

UNITED STATES PATENT AND TRADEMARK OFFICE
CERTIFICATE OF CORRECTION

PATENT NO. : 7,258,917 B2 Page 1 of 1
APPLICATION NO. : 10/655973
DATED : August 21, 2007
INVENTOR(S) : William L. Stebbings et al.

It is certified that error appears in the above-identified patent and that said Letters Patent is hereby corrected as shown below:

Column 1,
Line 32, delete "-aryl-4,5-diphenylimidazolyl" and insert -- aryl-4,5-diphenylimidazolyl --.

Column 8,
Line 41, delete "gluc" and insert -- glue --.

Column 9,
Line 63, after "added" delete "w" and insert -- with --.

Column 10,
Line 35, delete "or" and insert -- on --.
Line 48, delete "2,4,5-triarylinaidazolyl" and insert -- 2,4,5-triarylimidazolyl --.

Signed and Sealed this

Twenty-seventh Day of November, 2007

JON W. DUDAS
*Director of the United States Patent and Trademark Office*